US007791502B2

(12) United States Patent
Chen et al.

(10) Patent No.: US 7,791,502 B2
(45) Date of Patent: Sep. 7, 2010

(54) DETERMINING ASSET LOCATION VIA LOCAL TRIANGULATION

(75) Inventors: Yen-Fu Chen, Austin, TX (US); Randolph Michael Forlenza, Austin, TX (US); John Paul Kaemmerer, Pflugerville, TX (US); Raghuraman Kalyanaraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 12/174,904

(22) Filed: Jul. 17, 2008

(65) Prior Publication Data
US 2008/0278348 A1    Nov. 13, 2008

Related U.S. Application Data

(63) Continuation of application No. 10/782,677, filed on Feb. 19, 2004, now Pat. No. 7,477,163.

(51) Int. Cl.
*B60Q 1/48* (2006.01)
*G08G 1/14* (2006.01)

(52) U.S. Cl. .............................. 340/932.2; 340/426.24; 342/457; 342/459

(58) Field of Classification Search .............. 340/425.5, 340/426.1, 428, 430, 426.15, 426.18, 426.19, 340/426.21, 932.2; 342/450, 457, 459, 462
See application file for complete search history.

(56) References Cited

U.S. PATENT DOCUMENTS

| | | | | |
|---|---|---|---|---|
| 4,284,973 A | * | 8/1981 | Howell et al. ................ 340/429 |
| 5,091,727 A | * | 2/1992 | Mahmood ................. 340/932.2 |
| 5,153,586 A | * | 10/1992 | Fuller ...................... 340/932.2 |
| 5,432,495 A | | 7/1995 | Tompkins | |
| 5,497,149 A | | 3/1996 | Fast | |
| 5,612,668 A | * | 3/1997 | Scott ..................... 340/426.13 |
| 5,910,782 A | * | 6/1999 | Schmitt et al. ......... 340/995.12 |
| 6,148,212 A | * | 11/2000 | Park et al. ................ 455/456.1 |
| 6,211,818 B1 | | 4/2001 | Zach, Sr. | |
| 6,249,233 B1 | | 6/2001 | Rosenberg et al. ....... 340/932.2 |
| 6,266,612 B1 | | 7/2001 | Dussell et al. .............. 701/207 |
| 6,360,169 B1 | * | 3/2002 | Dudaney .................... 701/213 |
| 6,363,324 B1 | | 3/2002 | Hildebrant .................. 701/213 |
| 6,405,125 B1 | | 6/2002 | Ayed .......................... 701/200 |
| 6,489,897 B2 | | 12/2002 | Simon .................. 340/825.36 |
| 6,489,921 B1 | | 12/2002 | Wilkinson ............. 342/357.08 |

(Continued)

*Primary Examiner*—Jennifer Mehmood
(74) *Attorney, Agent, or Firm*—Yee & Associates, P.C.; William H. Steinberg; Rudolf O. Siegesmund

(57) ABSTRACT

The present invention is a method for locating an asset in a facility. An example of an asset is a vehicle and an example of a facility is a parking facility. When the user enters the facility with the asset, the user receives a base and code from a base/code booth. The code may be stored on a removable card. The user secures the asset by entering the code. While the user is away from the facility, the present invention monitors the base for movement detected by the motion sensor. When the user returns to the facility, a locator panel displays the location of the asset. The present invention determines the location of the asset by triangulation using the locators. The user then returns to the asset, deactivates the motion sensor, returns the base and code to a base/code booth, pays for the storage services, and exits the facility.

9 Claims, 4 Drawing Sheets

U.S. PATENT DOCUMENTS

| | | | |
|---|---|---|---|
| 6,580,372 B1 | 6/2003 | Harris | 340/686.6 |
| 6,618,005 B2 | 9/2003 | Hannah et al. | 342/357.1 |
| 6,784,841 B2 * | 8/2004 | Kuokkanen et al. | 342/450 |
| 6,885,311 B2 * | 4/2005 | Howard et al. | 340/932.2 |
| 6,927,700 B1 * | 8/2005 | Quinn | 340/932.2 |
| 7,064,657 B2 * | 6/2006 | Becker et al. | 340/426.1 |
| 7,181,426 B2 * | 2/2007 | Dutta | 705/37 |
| 2003/0197640 A9 * | 10/2003 | Johnson et al. | 342/357.07 |

* cited by examiner

DETERMINING ASSET LOCATION VIA LOCAL TRIANGULATION

CROSS-REFERENCE TO RELATED APPLICATION(S)

This application is a continuation application of U.S. utility patent application entitled "Apparatus and Method for Determining Asset Location Via Local Triangulation" filed on Feb. 19, 2004 and accorded Ser. No. 10/782,677 now U.S. Pat. No. 7,477,163, and claims priority therefrom.

FIELD OF THE INVENTION

The present invention is directed generally at a method for locating a vehicle and specifically to a method for locating a vehicle parked in a parking facility when GPS signals cannot be received.

BACKGROUND OF THE INVENTION

Parking facilities are very common in major cities and metropolitan areas. After parking a vehicle in a parking facility, people sometimes have difficulty finding their vehicle when they return to the parking facility. Moreover, if the parking facility contains multiple floors, then people can become frustrated when they have to walk up and down many flights of stairs in search of their vehicle. Therefore, a need exists in the art for a method for locating a vehicle in a parking facility.

The prior art has previously addressed the problem of locating a vehicle. For example, U.S. Pat. No. 6,489,921 (the '921 patent) entitled "Vehicle Locating Apparatus" discloses a method for determining the location of a vehicle in a parking facility. The method in the '921 patent uses Global Positioning System (GPS) satellites to determine the location of the vehicle. Indeed, the prior art includes several different patents in which GPS satellites are used to locate the position of a vehicle. Further examples of these patents include U.S. Pat. No. 6,489,897 entitled "Vehicle Location System" and U.S. Pat. No. 6,405,125 entitled "Parked Vehicle Locator."

The GPS-based prior art vehicle locators have many problems that are specific to parking facilities. One problem with GPS based systems is that vehicles must be equipped with a GPS receiver, which can be very expensive for the vehicle owners. A second problem is that GPS receivers require a direct line of sight to a plurality of GPS satellites in order to operate accurately. While line of sight is not usually a problem in open areas, the accuracy of the UPS system diminishes when the user is in close proximity to a plurality of tall buildings, such as those found in many downtown or metropolitan areas. The tall buildings limit the number of GPS satellites that are within line of sight of the GPS receiver. The GPS system becomes completely inoperative if the user enters a below ground parking facility. A third problem with GPS based systems is that the UPS satellites have also been disabled for maintenance, national security, and other reasons. When the GPS satellites are disabled, the user is unable to locate his vehicle. Therefore, a need exists for a method for determining the location of a vehicle which is not dependent on the UPS satellite system.

Even when the vehicle location system is not GPS based, parking facilities can offer unique challenges to vehicle locator systems. For example, if the parking facility is located below ground level, the ground can prevent transmission of radio frequency (RF) and other signals from the parking facility to external devices. Furthermore, if the parking facility is constructed out of reinforced concrete, the reinforcing material in the concrete can prevent transmission of RF and other signals between levels of the parking facility. Therefore, a need exists in the art for a method for locating a vehicle in a parking facility that is located below ground or in a reinforced concrete parking facility.

Another problem with parking facilities is the need for increased vehicle security. People tend to leave their vehicles unattended for extended periods in a parking facility, which creates an increased opportunity for theft, vandalism, or other damage to the vehicle. Security patrols reduce the likelihood of these types of crimes, but do not eliminate them. The effectiveness of the security patrols would be increased if the security patrol were given notification that a vehicle was being tampered with. Therefore, a need exists in the art for a method for notifying a security patrol that a vehicle is being tampered with.

Even when the parking facility is an attended or valet parking facility, the parking facility operators need to be aware of the location of the vehicle at all times. If one of the parking facility operators legitimately moves the vehicle from one location to another, the parking facility operators need to be aware of the authorized movement and the new location of the vehicle. Because the parking facility operators are responsible for the vehicle while it is at the attended or valet parking facility, the parking facility operators need to be able to discern between authorized and unauthorized movement of the vehicle. Therefore, a need exists for a method for determining the location of a vehicle and detecting authorized and unauthorized movement of the vehicle.

Consequently, a need exits in the art for a method for locating a vehicle in a parking facility. A need also exists for a method for determining the location of a vehicle which is not dependent on the GPS satellite system. The need extends to a method for locating a vehicle in a parking facility that is located below ground or in a reinforced concrete parking facility. The need also extends to a vehicle locator method that notifies a security patrol that a vehicle is being tampered with. Finally, a need exists for a vehicle location method that detects authorized and unauthorized movement of the vehicle.

SUMMARY OF THE INVENTION

The present invention, which meets the needs identified above, is a method for locating a user's vehicle in a parking facility. The present invention comprises a parking facility equipped with a plurality of locators and a base/card booth. When the user enters the parking facility with his vehicle, the user receives a base and card from the base/card booth. The user parks his vehicle, removes the card from the base, and secures his vehicle. The removal of the card from the base activates a motion sensor in the base. The user scans the card upon exiting the parking facility, notifying the parking facility that the user's vehicle is unattended.

While the user is away from the parking facility, the present invention monitors the base for movement detected by the motion sensor. If the motion sensor detects a disturbance in the base and/or vehicle, then the base notifies the parking facility that the vehicle has been disturbed and the present invention dispatches security personnel to the vehicle. The present invention determines the location of the vehicle by triangulation using the locators. When the user returns to the parking facility, the user scans his card at a locator panel. The locator panel displays the location of the user's vehicle and optionally prints a set of directions to the user's vehicle. The user then returns to his vehicle and inserts the card into the base to deactivate the motion sensor. The user then returns the base and card to a base/card booth, pays for the parking services, and exits the parking facility.

While the present invention is described in the context of an automotive vehicle located in a parking facility, the description is not meant as an architectural limitation. Persons of ordinary skill in the art will appreciate that the present invention may be used for tracking any type of asset in a facility. Persons of ordinary skill in the art will also appreciate that the present invention may be used in conjunction with, or in lieu of, the Global Positioning Satellite (GPS) system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "asset" shall mean a good that needs to be identified amongst a group of similar goods. An asset may be a vehicle that transports people, cargo or performs a service. However, an asset also includes inventory and other goods that need to be located when stored.

As used herein, the term "base" shall mean a device, associated with a specific card, wherein the device is placed in a vehicle to identify the location of the vehicle.

As used herein, the term "base/card booth" shall mean an apparatus for distributing and collecting bases and cards.

As used herein, the term "card" shall mean a device, associated with a specific base, used to locate a vehicle. The card is used in conjunction with a locator panel to locate a specific base, and thus a specific vehicle.

As used herein, the term "locator panel" shall mean a device for locating and displaying the location of a vehicle in a parking facility.

As used herein, the term 'locator' shall mean a device for communicating with and triangulating the location of a base in a parking facility.

As used herein, the term "facility" shall mean an area for storing a plurality of assets. If the assets are vehicles, the facility may be a parking facility.

While the present invention is described in the context of an automotive vehicle located in a parking facility, the description is not meant as an architectural limitation. Persons of ordinary skill in the art will appreciate that the present invention may be used for tracking any type of asset in a facility. Persons of ordinary skill in the art will also appreciate that the present invention may be used in conjunction with, or in lieu of the Global Positioning Satellite (GPS) system.

Figure 1:
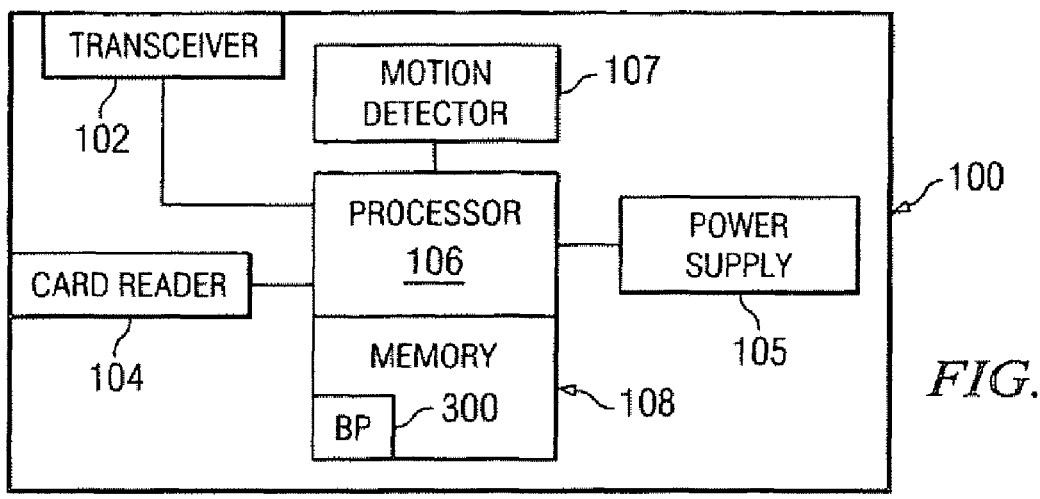
FIG. 1 is an illustration of the components of the base of the present invention.

FIG. 1 is an illustration of base 100 of the present invention. Base 100 component parts include transceiver 102, card reader 104, power supply 105, processor 106, motion detector 107, and memory 108. Transceiver 102 is a transmitter/receiver capable of wireless communication between processor 106 and other devices. Transceiver 102 may communicate by infrared, radio frequency (RF), BLUETOOTH®, or any other means known by persons of ordinary skill in the art. Card reader 104 is a device that reads magnetically encoded cards, such as card 110 (See FIG. 2). Card reader 104 also reads cards with other storage and information mediums such as bar code, optical, and other types of storage and information media. Power supply 105 is a device that supplies power to the components of base 100. Power supply 105 may be internal to base 100, such as battery or solar cell, or may link base 100 to an external power source, such as a 12V car accessory plug. Processor 106 is a microprocessor that controls the components of base 100. Processor 100 can execute the instruction contained memory 108, including Base Program (BP) 300. Motion detector 107 is a device that detects movement of base 100. Memory 108 is a non-volatile storage medium and includes BP 300. In alternative embodiments, the base can be equipped with a glass breakage sensor to detect the act of breaking one of the vehicle's windows. Persons of ordinary skill in the art are aware of how to configure the base of the present invention with a glass breakage sensor. Persons of ordinary skill in the art are also aware of component parts equivalent to the component parts illustrated in FIG. 1.

Figure 2:
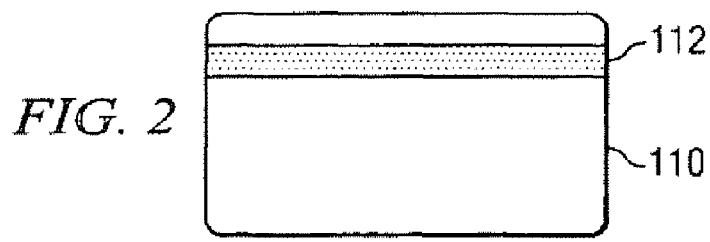
FIG. 2 is an illustration of the card of the present invention.

FIG. 2 is an illustration of card 110. Card 110 is a token that contains storage media 112. Storage media 112 identifies a specific card with a specific base 100. Storage media 112 may be magnetic, bar code, optical, non-volatile, or any other storage or identification media known to person of ordinary skill in the art. Additionally, persons of ordinary skill in the art are aware of configurations for card 110 other than the configuration illustrated in FIG. 2.

In an alternative embodiment, card 100 may be replaced by a lock, keypad, or radio buttons affixed to base 100 and/or locator panel 120. In this alternative embodiment, the user would use a key, key sequence, or code to activate and deactivate base 100. Persons of ordinary skill in the art are aware of how to configure a base, such as base 100, with a keypad, lock, or plurality of radio buttons.

Figure 3:
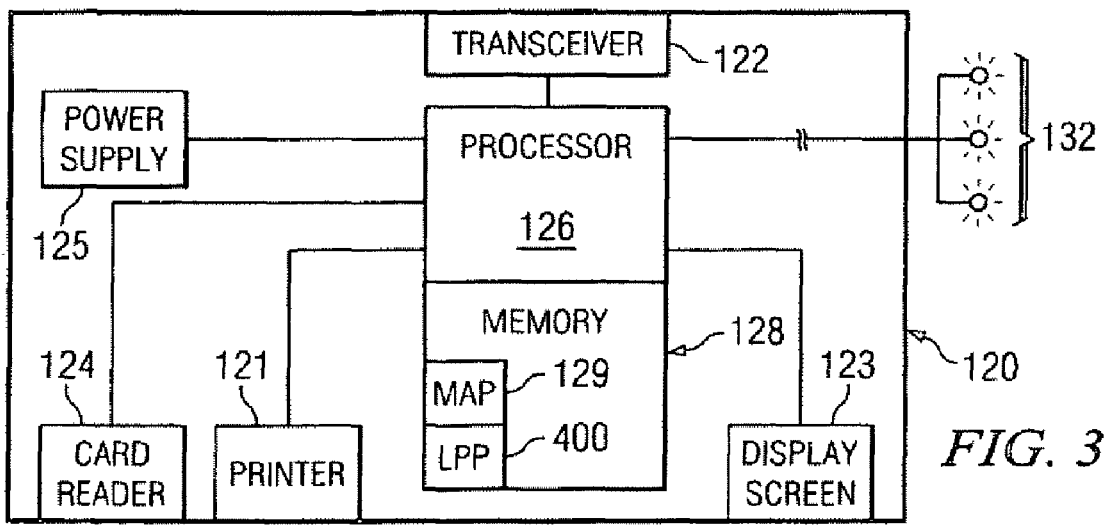
FIG. 3 is an illustration of the components of the locator panel of the present invention.

FIG. 3 is an illustration of locator panel 120 of the present invention. Locator panel 120 component parts include printer 121, transceiver 122, display screen 123, card reader 124, power supply 125, processor 126, and memory 128. Printer 121 is a device that prints the direction from the location of locator panel 120 to the user's vehicle. Transceiver 122 is a transmitter/receiver capable of wireless communication between processor 126 and other devices. Transceiver 122 may communicate by infrared, radio frequency (RF), BLUETOOTH®, or any other means known by persons of ordinary skill in the art. Display screen 123 is a monitor capable of displaying a graphical user interface (GUI), typically a map of the parking facility. Display screen 123 can be configured such that a user can interface with locator panel 120 through display screen 123. Card reader 124 is a device that reads magnetically encoded cards, such as card 110. Card reader 124 also reads cards with other storage and information mediums such as bar code, optical, and other types of storage and information media. Power supply 125 is a device that supplies power to the components of locator panel 120. Power supply 125 may be internal to locator panel 120, such as battery or solar cell, or may link locator panel 120 to an external power source, such as a 120V electrical plug. Processor 126 is a microprocessor that controls the components of locator panel 120. Processor 126 can execute the instruction contained memory 128, including map 129 and Locator Panel Program (LPP) 400. Processor 126 is also connected to a plurality of locators 132. Processor 126 may be connected to locators 132 through a wireless means, such as transceiver 122. Processor 126 may also be connected to locators 132 by a wired means. Memory 128 is a non-volatile storage medium and includes map 129 and LPP 400. Persons of ordinary skill in the art are aware of component parts equivalent to the component parts illustrated in FIG. 3.

Figure 4:
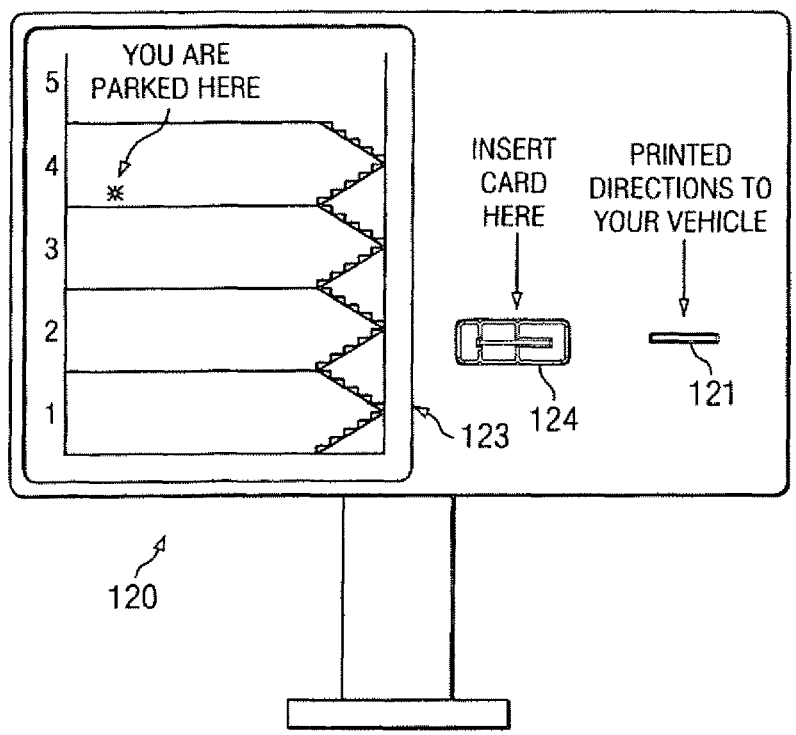
FIG. 4 is an illustration of the exterior of the locator panel of the present invention.

FIG. 4 is an illustration of the exterior of locator panel 120. As can be seen in FIG. 4, a user can locate their vehicle and interface with locator panel 120 through display screen 123. The user inserts his card into card reader 124 and locator panel 120 requests that the system located the corresponding vehicle by triangulating the vehicle's location and displays the position of the user's vehicle. If desired, the user may obtain printed directions to the user's vehicle from printer 121.

Figure 5:
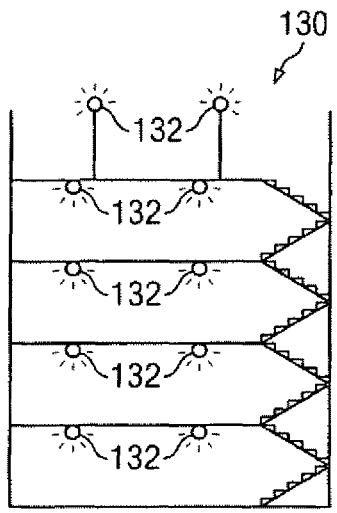
FIG. 5 is an illustration of the locators of the present invention.
Figure 6:
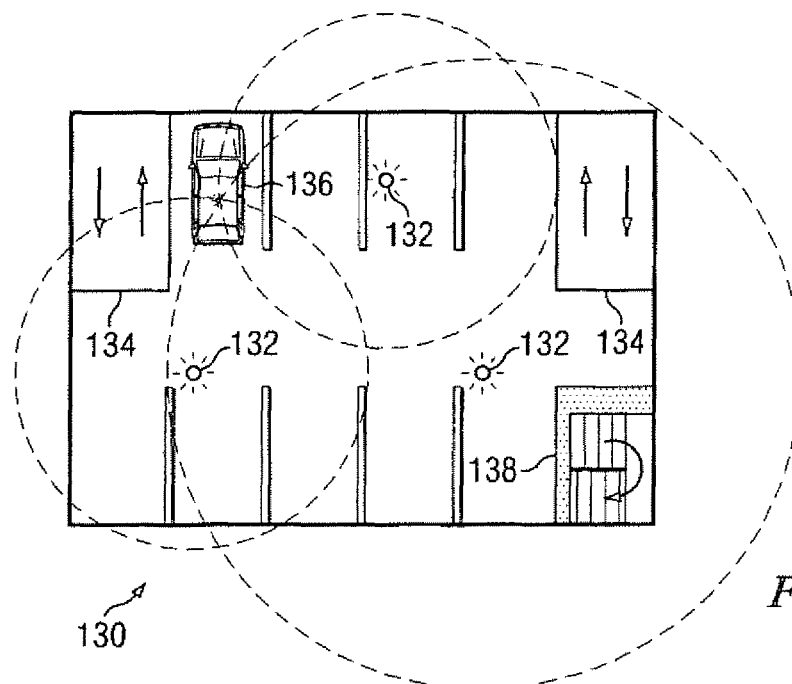
FIG. 6 is an illustration of the triangulation process of the present invention.

FIGS. 5 and 6 is an illustration of parking facility 130 equipped with locators 132. Each floor of parking facility 130 is equipped with a plurality of locators 132. As seen in FIG. 6, each floor also contains plurality of ramps 134 and a stairwell 138. Positioning at least three locators 132 on each floor of the parking facility removes the need to transmit signals through the parking facility construction material or from floor to floor inside the parking facility. The present invention can triangulate the position of vehicle 136 by triangulating the position of the base (not shown), and thus vehicle 136, using three locators 132. The distance from three locators 132 marks the exact location of vehicle 136. Each of the three circles in FIG. 6 represents a uniform distance from a particular locator 132. The three circles intersect at only one location: the location of vehicle 136. Persons of ordinary skill in the art are aware of how to configure locators 132 with ranging capabilities so that three locators 132 may triangulate the position of vehicle 136.

Figure 7:
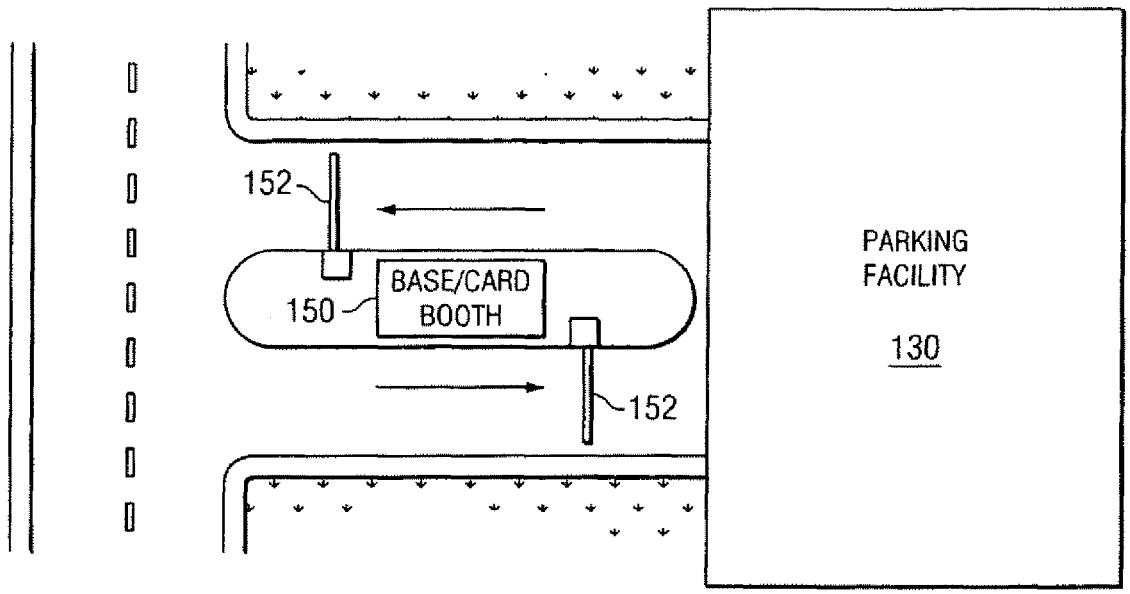
FIG. 7 is an illustration of the base and card booth of the present invention.

FIG. 7 illustrates the correlation of parking facility 130 and base/card booth 150. Parking facility 130 contains one or more base/card booths 150 that control a plurality of gates 152. When a user enters parking facility 130, the user stops at base/card booth 150 to obtain a base and card (not shown). When the user obtains the base and card, base/card booth 150 opens gate 152 to allow the user to enter parking facility 130. When the user exits parking facility 130, the user must return the base and card to base/card booth 150 before base/card booth 150 will open gate 152. The user may also pay for the parking at base/card boot 150 or a separate facility.

Figure 8:
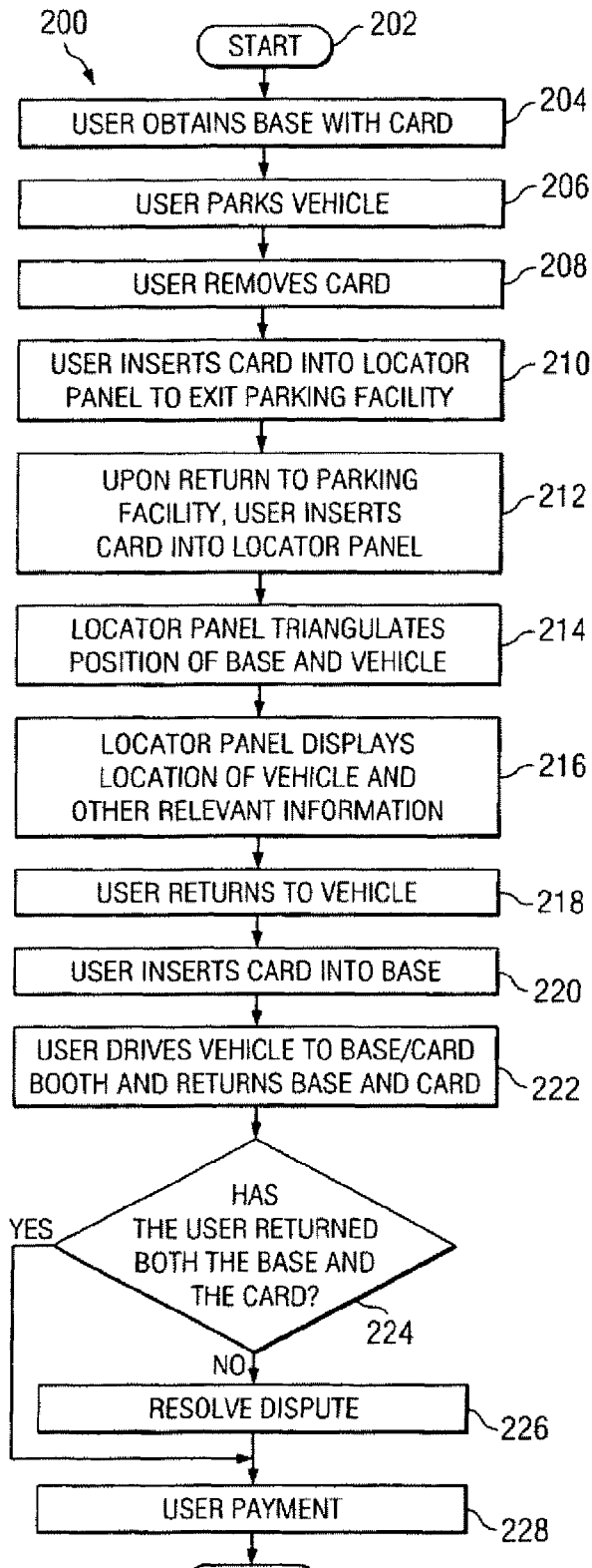
FIG. 8 is an illustration of the logic of the procedure for using the present invention.

FIG. 8 is an illustration of the overall logic of usage process 200 the present invention. Usage process 200 details the user's progress through a parking facility of the present invention. Usage process 200 starts (202) when the user seeks to enter the parking facility of the present invention. The user obtains a base and a card from the base/card booth (204). Persons of ordinary skill in the art are aware of other methods in which a user may obtain a base and card. The user then parks his vehicle (206). The user removes the card from the base, leaving the base in the user's vehicle (208). The user then secures his vehicle and inserts the card into the locator panel upon exiting the parking facility (210). When the user returns to the parking facility, the user inserts the card into the locator panel (212). The locator panel triangulates the position of the base and thus the user's vehicle (214). The locator panel then displays the location of the user's vehicle and any other relevant information (216). If desired, the user can obtain a printed set of direction to the user's vehicle from the locator panel. The user may also pay for the parking services at the locator panel. In an alternative embodiment, when the user inserts the card into the locator panel, the locator panel instructs the base to illuminate a light. This makes it easier for the user to find his vehicle if the vehicle is parked with a plurality of similar vehicles. In other alternative embodiments, the locator panel can give the user information regarding direction to a specific area, the weather, the estimated cost of parking, whether checks or credit cards are accepted, the hours of operation, the location to the nearest card/base booth, and so forth.

The user then returns to his vehicle (218). The user then inserts the card into the base (220). The user drives his vehicle to the base/card booth and returns the base and card (222). The base/card booth then determines whether the user has returned both the base and the card (224). If the user has returned both the base and card, then usage process 200 proceeds to step 228. If the user has not returned both the base and the card, then the dispute over the unreturned item is resolved, possibly by payment of a fee (226), then proceeds to step 228. At step 228, the user pays for the parking services, if he has not already done so (228). The usage process ends (230) when the user exits the parking facility.

Figure 9:
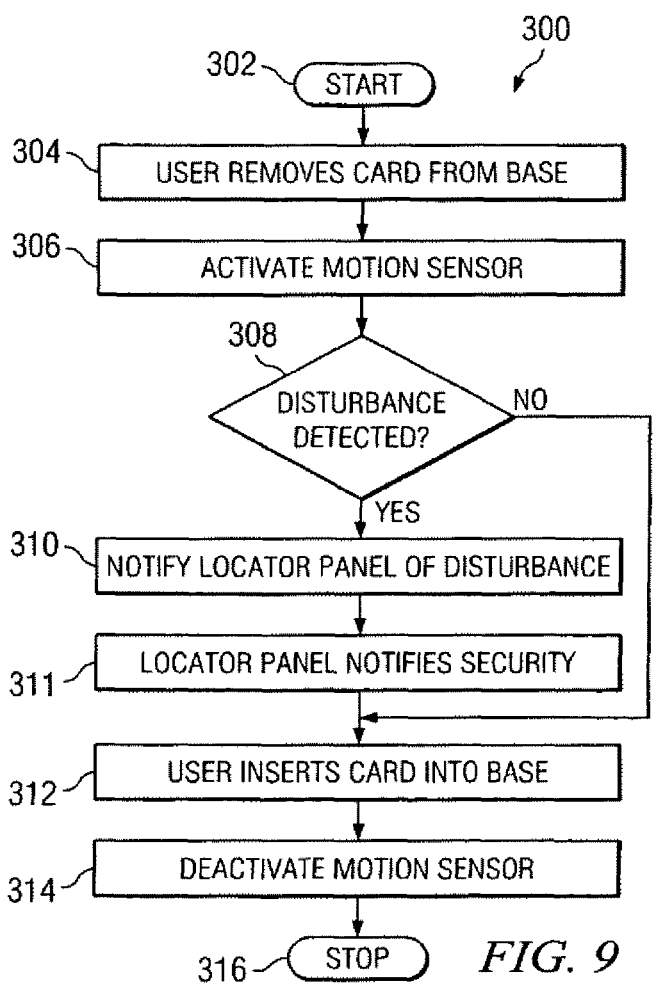
FIG. 9 is an illustration of the logic of the base program of the present invention.

FIG. 9 is an illustration of the logic of Base Program (BP) 300 of the present invention. BP 300 is a program that runs within the base of the present invention. BP 300 starts (302) when the user obtains the base from the base/card booth. After the user has parked his vehicle, the user removes the card from the base (304). The base may be like base 100 in FIG. 1. The card may be like card 110 in FIG. 2. Removing the card from the base activates the motion sensor in the base (306). The motion sensor may optionally be activated after a delay to allow the user to exit and secure the vehicle. BP 300 then determines whether the motion sensor has detected a disturbance (308). If the motion detector has not detected a disturbance, then BP 300 proceeds to step 312. If the motion sensor has detected a disturbance, then BP 300 notifies the locator panel of the disturbance (310). Locator panel may be like locator panel 120 in FIG. 3. The base may notify the locator panel of the disturbance via a transceiver in the base, or any other means known to persons of ordinary skill in the art. BP 300 may optionally wait a small amount of time before sending the disturbance signal as the user will typically disturb the motion sensor when entering the vehicle. The locator panel then notifies security of the disturbance (311). The user then inserts the card into the base (312). Inserting the card into the base deactivates the motion sensor (314). BP 300 then ends (316).

Figure 10:
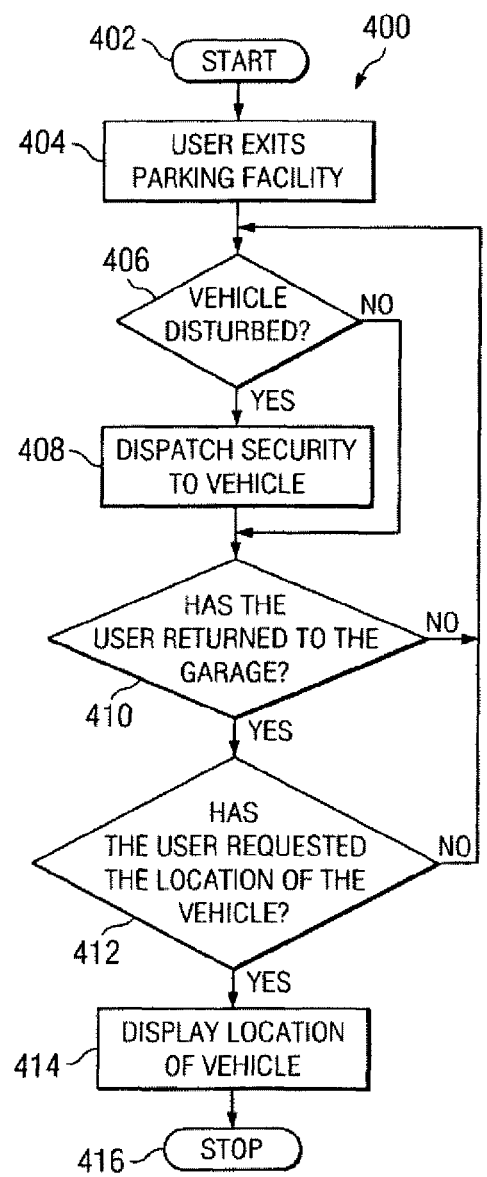
FIG. 10 is an illustration of the logic of the locator panel program of the present invention.

FIG. 10 is an illustration of the logic of Locator Panel Program (LPP) 400. LPP 400 is a program that operates on the locator panel. LPP starts (402) when the user obtains the base and card from the base/card booth. The base/card booth may be like base/card booth 150 in FIG. 7. The user then parks their vehicle and LPP 400 then detects the user exiting the parking facility (404). The user indicates that they have left the parking facility by scanning the card as they exit the parking facility. Alternatively, LPP 400 can assume that the user has left the parking facility when the user has not scanned his card in a predetermined amount of time. LPP 400 then determines whether the vehicle has been disturbed (406). LPP 400 can determine whether the vehicle has been disturbed by monitoring for signals transmitted by the base. If the vehicle has not been disturbed, then LPP 400 proceeds to step 410. If the vehicle has been disturbed, then LPP 400 dispatches security to the vehicle (408). LPP 400 can dispatch security to the vehicle by notifying a security officer that the motion sensor in the base has detected a disturbance. LPP 400 can detect the location of the base by triangulation. LPP 400 then proceeds to step 410.

At step 410, LPP 400 determines whether the user has returned to the facility (410). If the user has not returned to the facility, then LPP 400 returns to step 406. If the user has returned to the facility, then LPP 400 determines whether the user has requested the location of the vehicle (412). The user can request the location of the vehicle from the locator panel. If the user has not requested the location of the vehicle, then LPP 400 returns to step 406. If the user has requested the location of the vehicle, then LPP 400 displays the location of the vehicle to the user (414). LPP 400 can optionally print a set of directions to the vehicle for the user. LPP 400 ends (416) when the user exits the parking facility with their vehicle and returns the base and card to the base/card booth.

In an alternative embodiment, card 110 can be configured with a transceiver that allows the parking facility and/or the base to determine the location of card 110. The transceiver may be an active transceiver with a power supply or a passive RF transceiver. In either case, the user could simply carry card 110 instead of inserting and removing card 110 from base 100 and locator panel 120.

While the present invention is described in the context of an automotive vehicle located in a parking facility, the description is not meant as an architectural limitation. The present invention may be used for a variety of other purposes. The present invention is useful whenever an organization needs to track moveable inventory or other assets in a facility. Examples of other applications include locating wheelchairs in a hospital, locating forklifts or other heavy equipment in a factory, and locating tugs and auxiliary power units (APUs) at an airport. Persons of ordinary skill in the art are aware of other applications for the present invention. Persons of ordinary skill in the art will also appreciate that the present invention may be used in conjunction with, or in lieu of the Global Positioning Satellite (GPS) system.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for determining the location of an asset comprising:
   removing a card from a base, the base placed in the asset and comprising a sensor;
   scanning the card at a locator panel in a facility to indicate that the asset is unattended in the facility, wherein a construction material for the facility prevents a transmission of signals between floors of the facility, and each floor of the facility comprises at least three locators in communication with the locator panel, the at least three locators configured to determine, with the locator panel, a location of the base;
   determining, by the sensor, whether the asset has been disturbed; and
   responsive to a determination that the asset has been disturbed, dispatching a security patrol to the location of the base provided by the locator panel.

2. The method of claim 1 further comprising:
   responsive to scanning the card at the locator panel, printing directions from the locator panel to the asset or displaying the location of the asset on a display screen.

3. The method of claim 1 further comprising:
   determining whether a user, who has scanned the card and left the facility, has returned to the facility because the card has been re-scanned; and
   responsive to determining that the user has returned to the facility, and responsive to determining that the asset has been disturbed, taking no action.

4. The method of claim 1 further comprising:
   wherein the sensor is a motion sensor.

5. The method of claim 1 further comprising:
   wherein the sensor is a glass breakage sensor.

6. The method of claim 1 further comprising storing a code on the card and inserting the card into the locator panel.

7. The method of claim 1 further comprising entering a code into a keypad on the locator panel.

8. The method of claim 1 wherein the asset is a vehicle.

9. The method of claim 1 wherein the facility is a parking facility.

* * * * *